(12) United States Patent
Forsell (10) Patent No.: US 10,127,048 B2
(45) Date of Patent: Nov. 13, 2018

(54) ARCHITECTURE FOR LONG LATENCY OPERATIONS IN EMULATED SHARED MEMORY ARCHITECTURES

(71) Applicant: Teknologian tutkimuskeskus VTT OY, VTT (FI)

(72) Inventor: Martti Forsell, Oulu (FI)

(73) Assignee: Teknologian tutkimuskeskus VTT OY, VTT (FI)

( * ) Notice: Subject to any disclaimer, the term of this patent is extended or adjusted under 35 U.S.C. 154(b) by 227 days.

(21) Appl. No.: 15/105,583

(22) PCT Filed: Dec. 16, 2014

(86) PCT No.: PCT/FI2014/051002
§ 371 (c)(1),
(2) Date: Jun. 17, 2016

(87) PCT Pub. No.: WO2015/092131
PCT Pub. Date: Jun. 25, 2015

(65) Prior Publication Data
US 2016/0314001 A1    Oct. 27, 2016

(30) Foreign Application Priority Data

Dec. 19, 2013  (EP) .................................. 13198516

(51) Int. Cl.
*G06F 9/38* (2018.01)
*G06F 9/30* (2018.01)

(52) U.S. Cl.
CPC .......... *G06F 9/3867* (2013.01); *G06F 9/3001* (2013.01); *G06F 9/3004* (2013.01);
(Continued)

(58) Field of Classification Search
None
See application file for complete search history.

(56) References Cited

U.S. PATENT DOCUMENTS 5,867,649 A * 2/1999 Larson .................... G06F 8/314
709/201
6,463,527 B1 * 10/2002 Vishkin ................. G06F 9/3009
712/219
(Continued)

FOREIGN PATENT DOCUMENTS

WO        0033183 A1    6/2000

OTHER PUBLICATIONS

Forsell, Marti, MTAC—A Multithreaded VLIW Architecture for PRAM Slmulation, 1997,Springer Pub. Co., Journal of Universal Computer Science, vol. 3, No. 9, pp. 1037-1055.*
(Continued)

*Primary Examiner* — Eric Coleman
(74) *Attorney, Agent, or Firm* — Berggren LLP (57) ABSTRACT

A processor architecture arrangement for emulated shared memory (ESM) architectures, comprises a number of, preferably a plurality of, multi-threaded processors each provided with interleaved inter-thread pipeline, wherein the pipeline comprises a plurality of functional units arranged in series for executing arithmetic, logical and optionally further operations on data, wherein one or more functional units of lower latency are positioned prior to the memory access segment in said pipeline and one or more long latency units (LLU) for executing more complex operations associated with longer latency are positioned operatively in parallel with the memory access segment. In some embodiments, the pipeline may contain multiple branches in parallel with the memory access segment, each branch containing at least one long latency unit.

13 Claims, 4 Drawing Sheets

(52) U.S. Cl.
CPC ...... *G06F 9/30029* (2013.01); *G06F 9/30058* (2013.01); *G06F 9/3873* (2013.01); *G06F 9/3895* (2013.01)

(56) References Cited

U.S. PATENT DOCUMENTS

| | | | | |
|---|---|---|---|---|
| 9,891,927 | B2* | 2/2018 | Henry | G06F 9/3885 |
| 2002/0059502 | A1* | 5/2002 | Reimer | G06F 11/2242 |
| | | | | 711/152 |
| 2002/0169942 | A1 | 11/2002 | Sugimoto | |
| 2003/0014736 | A1* | 1/2003 | Nguyen | G06F 11/362 |
| | | | | 717/129 |
| 2007/0185953 | A1* | 8/2007 | Prokopenko | G06F 7/483 |
| | | | | 708/523 |
| 2008/0313438 | A1 | 12/2008 | Luick | |

OTHER PUBLICATIONS

Forsell, M, Step Caches—a Novel Approach to Concurrent Memory Access on Shared Memory MP-SOCs, In the proceedings of the 23th IEEE NORCHIP Conference, Nov. 21-22, 2005, Oulu, Finland, 74-77.

Forsell, M, Reducing the associativity and size of step caches in CRCW operation, In the Proceeding of 8th Workshop on Advances in Parallel and Distributed Computational Models (in conjunction with the 20th IEEE International Parallel and Distributed Processing Symposium, IPDPS'06), Apr. 25, 2006, Rhodes, Greece.

Forsell, M, Realizing Multioperations for Step Cached MP-SOCs, In the Proceedings of the International Symposium on System-on-Chip 2006 (SOC'06), Nov. 14-16, 2006, Tampere, Finland, 77-82.

Forsell, M, Total Eclipse—An Efficient Architectural Realization of the Parallel Random Access Machine, In Parallel and Distributed Computing Edited by Alberto Ros, INTECH, Vienna, 2010, 39-64.

Forsell, M et al. Supporting Ordered Multiprefix Operations in Emulated Shared Memory CMPs, In the Proceedings of the 2011 International Conference on Parallel and Distributed Processing Techniques and Applications (PDPTA'11), Jul. 18-21, 2011, Las Vegas, USA, 506-512.

Search report of the international application No. PCT/FI2014/051002 issued by European Patent Office dated Apr. 22, 2015.

Search report of the priority application EP13198516.0 issued by European Patent Office dated May 14, 2014.

* cited by examiner

ARCHITECTURE FOR LONG LATENCY OPERATIONS IN EMULATED SHARED MEMORY ARCHITECTURES

FIELD OF THE INVENTION

Generally the present invention pertains to computer science and computer architectures. In particular, the invention relates to the execution of long latency operations in connection with emulated shared memory architectures.

BACKGROUND

In SMAs (shared memory architecture), data and program partitioning is typically carried out by placing data requiring processing by multiple threads into the shared memory and splitting program more independently to processors, thus making programming easier compared to message passing (MPA) architectures in which processing happens always locally and the programmer is responsible for moving data around accordingly. Unfortunately most SMAs use a distributed shared memory architecture consisting of multiple interconnected processor-cache pairs, which makes cache coherency (and therefore latency tolerance) and synchronicity maintenance very expensive. This may even ruin their performance in communication intensive problems.

To tackle e.g. the above problem, the emulated shared memory (ESM), or shared memory emulation, architectures have been introduced. They incorporate a set of multi-threaded processors that are connected via a high-throughput intercommunication network to a common uniformly and synchronously accessible shared memory. The memory system latency is hidden by overlapping on-going memory references and a special low-cost synchronization mechanism is established guaranteeing synchronicity at machine instruction level. The ESM systems provide the user with perception of ideal shared memory even though the actual hardware architecture comprises a physically distributed memory. From a theoretical standpoint, these architectures attempt to emulate the abstract parallel random access machine (PRAM) that is commonly used as a model for describing and analyzing the intrinsic parallelism of computational problems as well as performance and cost of executing parallel algorithms due to its simplicity and expressivity. A PRAM model generally refers to a set of processors working under the same clock and a uniform single step accessible shared memory connected to them.

Accordingly, ESM is a feasible technique to address programmability and performance scalability concerns of chip multiprocessors (CMP) as it yields implied synchrony in the execution of machine instructions, efficient latency hiding technique, and sufficient bandwidth to route all the memory references even with heavy random and concurrent access workloads. Synchronous execution is considered to make programming easier as a programmer does not need to synchronize the threads of execution explicitly after each global memory access but can rely on the hardware to take care of that automatically, whereas e.g. in message passing architectures (MPA), a programmer is responsible for explicitly defining communication, synchronizing subtasks, and describing data and program partitioning between threads making MPAs difficult to program. Latency hiding used in shared memory emulation makes use of the high-throughput computing scheme, where other threads are executed while a thread refers to the global shared memory. Since the throughput computing scheme employs parallel slackness extracted from the available thread-level parallelism, it is considered to provide enhanced scalability in contrast to traditional symmetric multiprocessors and non-uniform memory access (NUMA) systems relying on snooping or directory-based cache coherence mechanisms and therefore suffering from limited bandwidth or directory access delays and heavy coherence traffic maintenance.

Recently, scalable ESM architectures have been suggested incorporating step caches to implement the concurrent read concurrent write (CRCW) memory access variant of PRAM, which further simplifies programming and increases performance by a logarithmic factor in certain cases. Also a mechanism to support constant execution time multi(-prefix)operations—implementing even stronger multioperation concurrent read concurrent write (MCRCW) variant of the PRAM model—has been implemented with the help of scratchpads that are attached to step caches in order to bound the associativity of step caches. For instance, publications 1: M. Forsell, Step Caches—a Novel Approach to Concurrent Memory Access on Shared Memory MP-SOCs, In the Proceedings of the 23th IEEE NORCHIP Conference, Nov. 21-22, 2005, Oulu, Finland, 74-77, 2: M. Forsell, Reducing the associativity and size of step caches in CRCW operation, In the Proceeding of 8th Workshop on Advances in Parallel and Distributed Computational Models (in conjunction with the $20^{th}$ IEEE International Parallel and Distributed Processing Symposium, IPDPS'06), Apr. 25, 2006, Rhodes, Greece, 3: M. Forsell, Realizing Multioperations for Step Cached MP-SOCs, In the Proceedings of the International Symposium on System-on-Chip 2006 (SOC'06), Nov. 14-16, 2006, Tampere, Finland, 77-82., 4: M. Forsell, TOTAL ECLIPSE—An Efficient Architectural Realization of the Parallel Random Access Machine, In Parallel and Distributed Computing Edited by Alberto Ros, INTECH, Vienna, 2010, 39-64., and 5: M. Forsell and J. Roivainen, Supporting Ordered Multiprefix Operations in Emulated Shared Memory CMPs, In the Proceedings of the 2011 International Conference on Parallel and Distributed Processing Techniques and Applications (PDPTA'11), Jul. 18-21, 2011, Las Vegas, USA, 506-512, contemplate different aspects of such a solution and are thereby incorporated herein by reference in their entireties. Multi(-prefix)operations can be defined for many basic operations, e.g. ADD, SUB, MAX etc., and considered as parallel primitives due to the capability to express parallel algorithms. They can be used for synchronization and parallel data structures simultaneously accessed by several processors without race conditions and other anomalies of architectures executing threads asynchronously.

Figure 1:
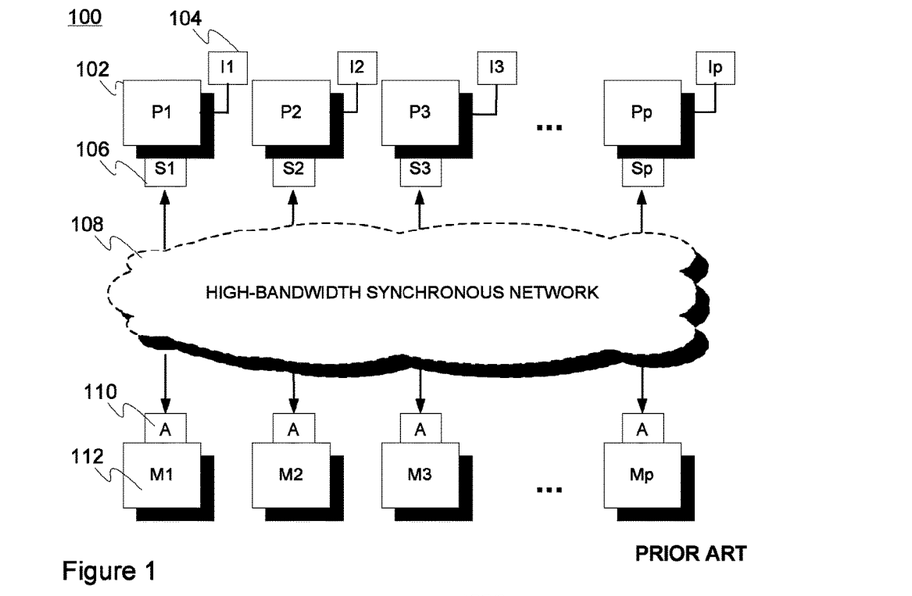
FIG. 1 is a block diagram of a feasible scalable architecture to emulate shared memory on a silicon platform.

In FIG. 1, a high-level illustration of a scalable architecture to emulate shared memory on a silicon platform is shown. It comprises a set of processors (cores) P1, P2, P3, . . . , Pp 102 connected to a physically distributed, but logically shared (data) memory M1, M2, M3, . . . , Mp 112 via a physically scalable high bandwidth interconnection network 108. Active memory units 110 in connection with data memory 112 can be considered as memory control logic units utilized to process the memory references. The active memory units 110 are arranged to manage computation related to cases in which multiple memory references are targeted to the same memory location during e.g. multi(-prefix) operations, for instance. Instruction memory modules I1, I2, I3, . . . , Ip 104 are configured to carry the program code for each processor 102. To efficiently emulate shared memory by the distributed memory-based implementation, the processors 102 are multithreaded utilizing a Tp-stage cyclic, interleaved inter-thread pipeline (Tp≥the average latency of the network). The PRAM model is linked to the architecture such that a full cycle in the pipeline corresponds typically to a single PRAM step. During a step of multi-threaded execution (regarding the pipeline in overall, i.e. all pipeline stages including the actual execution stage), each thread of each processor of the CMP executes an instruction including at most one shared memory reference sub-instruction. Therefore a step lasts for multiple, at least Tp+1 clock cycles.

In the depicted architecture, step caches are generally associative memory buffers in which data stays valid only to the end of ongoing step of multithreaded execution. The main contribution of step caches to concurrent accesses is that they step-wisely filter out everything but the first reference for each referenced memory location. This reduces the number of requests per location from P Tp down to P allowing them to be processed sequentially on a single ported memory module assuming Tp≥P. Scratchpads are addressable memory buffers that are used to store memory access data to keep the associativity of step caches limited in implementing multioperations with the help of step caches and minimal on-core and off-core ALUs (arithmetic logic unit) that take care of actual intra-processor and inter-processor computation for multioperations. Scratchpads may be coupled with step caches to establish so-called scratchpad step cache units S1, S2, S3, . . . , Sp 106.

One underlying idea of the reviewed solution is indeed in the allocation of each processor core 102 with a set of threads that are executed efficiently in an interleaved manner and hiding the latency of the network. As a thread makes a memory reference, the executed thread is changed and the next thread can make its memory request and so on. No memory delay will occur provided that the reply of the memory reference of the thread arrives to the processor core before the thread is put back to execution. This requires that the bandwidth of the network is high enough and hot spots can be avoided in pipelined memory access traffic. Synchronicity between consecutive instructions can be guaranteed by using an elastic synchronization wave between the steps, for instance.

Figure 2:
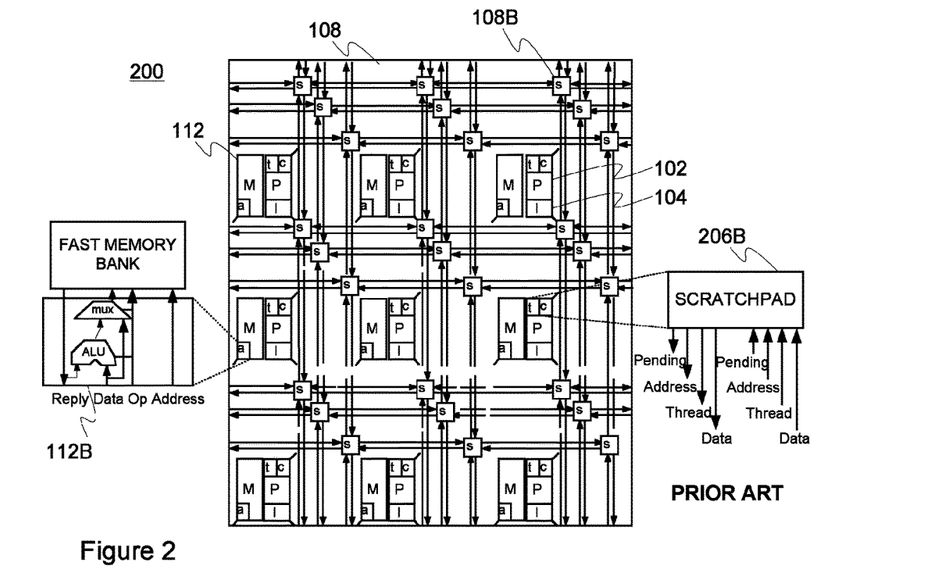
FIG. 2 is another representation of a feasible ESM architecture, essentially CMP ESM architecture.

FIG. 2 shows, at 200, one illustration of an ESM CMP architecture incorporating e.g. the aforementioned active memory units 112B (with ALU and fetcher) in connection with data memory modules 112 and scratchpads 206B. The network 108 may be a mesh-like interconnection network acting as a high-bandwidth pipelined memory system with switches 108B. The memory access latency is hidden by executing other threads while a thread is referencing the uniformly accessible distributed shared memory via the network 108. Congestion of references and hot spots in communication can be avoided with an efficient dead-lock free intercommunication architecture featuring high bandwidth (bisection BW≥P/4) and randomized hashing of memory locations over the distributed memory modules. Execution of instructions happens in steps corresponding to a single PRAM step during which each thread executes a single instruction.

Despite of the many aforementioned advantages, ESM systems have appeared difficult to realize in truly optimal fashion. A physically feasible memory unit (MU) making use of step cache and scratchpad techniques to support strong concurrent memory access and multi(-prefix)operations is easily comprehensible as one key component of powerful emulated shared memory architecture like REPLICA (REmoving Performance and programmability LImitations of Chip multiprocessor Architectures), which is basically a configurable ESM. Such MU may be configured to send the outgoing memory references to the shared memory system as well as wait and receive possible replies therefrom, for example.

Figure 3:
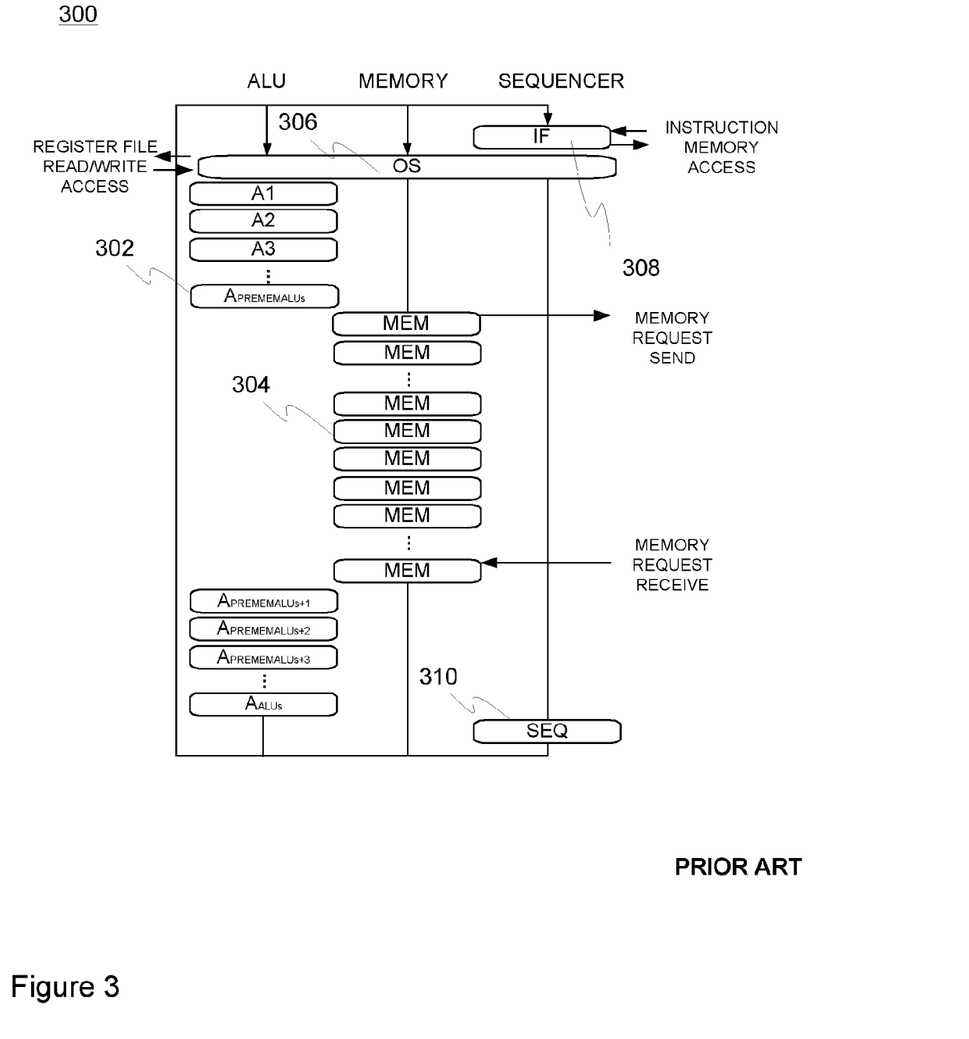
FIG. 3 is a high-level block diagram and pipeline representation of an embodiment of an MCRCW ESM processor.

FIG. 3 represents, at 300, a high-level block diagram and pipeline of a typical MCRCW ESM processor making use of e.g. step caches. A processor in a step cache-based MCRCW (C)ESM CMP comprises A ALUs, M memory units (MU), a distributed or unified register block, a sequencer and some glue logic. In the figure Ax 302 refers to ALU x, IF 308 refers to instruction fetch logic, MEM 304 refers to memory unit stage, OS 306 refers to operand selection logic and SEQ 310 refers to sequencer. As implied in the figure, there are ALUs 302 logically positioned prior to and after the memory unit wait segment.

Generally, integer-based arithmetic operations taken care of by ALUs in the modern processor architectures include addition, subtraction, multiplication and division. Further, the ALUs are often responsible for performing logical operations that may incorporate comparing e.g. two data elements to each other to sort out which was smaller/bigger or whether they were equal, and making related decisions based on the outcome of such comparisons.

Yet, specialized functional units may be allocated for executing certain specific tasks and operations involving calculations of particular complexity, for instance. Execution of such complex or otherwise special operations could require additional logic or hardware, and take a greater number of clock cycles or generally just take longer, i.e. cause a longer latency, to complete in contrast to e.g. basic ALU operations.

In processor architectures, several parallel processing paths may be provided, each potentially provided with special purpose or specific task to be performed using the hardware disposed on that particular path. Nevertheless, the latency caused by the associated elements and related processing taking place in the paths often adds to the overall execution time of instructions proceeding in the processor pipeline structure.

SUMMARY OF THE INVENTION

The objective is to at least alleviate one or more problems described hereinabove not yet fully satisfactorily addressed by the known ESM arrangements, and to provide a feasible solution for executing long latency operations, such as division or application-specific operations, effectively thereat.

The objective is achieved by embodiments of processor architecture in accordance with the present invention.

Accordingly, in one aspect of the present invention a processor architecture arrangement for emulated shared memory (ESM) architectures, comprises a number of, preferably a plurality of, multi-threaded processors each provided with interleaved inter-thread pipeline, wherein the pipeline comprises a plurality of functional units arranged in series for executing arithmetic, logical and optionally further operations on data, wherein one or more functional units of lower latency are positioned prior to the memory access segment in said pipeline and one or more long latency units for executing more complex operations associated with longer latency are positioned operatively in parallel with the memory access segment.

Optionally, there also are one or more functional units in the plurality functionally located after the memory access segment, which units are preferably at least generally, i.e. regarding at least most such units, of lower latency.

In one embodiment the plurality of functional units comprises a number of ALUs.

In another, supplementary or alternative, embodiment, a further number of long latency units including at least one unit are positioned operatively in parallel with the aforementioned one or more long latency units. Optionally, the pipeline may thereby contain two or more branches or branch portions at least during the memory access segment (in parallel therewith) wherein each branch incorporates at least one dedicated long latency unit configured to operate during memory access. Logically, these mutually parallel branches may be located in series with the remaining functional units preceding and following the memory access segment.

In a further embodiment, at least two or more of the included long latency units are chained together into at least one chain, wherein data may be passed from one unit to another. The chained functional units may be configured to execute mutually different operations on the input data (operands), for example.

Yet, in a further embodiment, at least part of the functional units are controlled through predetermined (sub-)instruction operation field(s) and associated values provided in the instruction, or 'instruction word'.

Still in a further embodiment, an operand for a functional unit is determined in the operand select stage of pipeline in accordance with the operand selection field(s) (values) given in the instruction (word). Operand for a functional unit may also be inherited from a previous functional unit connected thereto in the same chain. Connections between functional units may be enabled by a number of multiplexers controlled by the instruction words.

In a further embodiment, at least one long latency unit is configured to execute division, square-root or application-specific operations. The long latency units may supplement (more traditional) ALU(s) in bringing in versatile arithmetics or generally operation support to the pipeline and overall processor architecture in question.

In a further embodiment, at least one long latency unit is internally pipelined.

The utility of the present invention is due to several issues depending on the embodiment. It basically allows the execution of long latency operations such as divisions in emulated shared memory computers within a single step of multi-threaded execution even though such operations typically take multiple execution steps. Because the memory wait segment of the pipeline may be practically merged with the logic implementing long latency operations, the programmer sees the long latency operations executing in a single step, and the latency arising from the execution is hidden within the latency in any case caused by the memory access. The obtained benefits in terms of performance increase are evident in the context of e.g. multicore processor-based computers and their programming.

The expression "a number of" refers herein to any positive integer starting from one (1), e.g. to one, two, or three.

The expression "a plurality of" refers herein to any positive integer starting from two (2), e.g. to two, three, or four.

The terms "operatively", "logically" and "functionally" are used herein inter-changeably particularly in connection with expressions relating to "parallelism", "parallel elements", or "parallel functionalities" to differentiate from physical or merely physical parallelism, i.e. merely physically parallel layout of elements.

Different embodiments of the present invention are disclosed in the dependent claims.

BRIEF DESCRIPTION OF THE RELATED DRAWINGS

Next the invention is described in more detail with reference to the appended drawings in which.

DETAILED DESCRIPTION OF THE EMBODIMENTS

FIGS. 1-3 were already contemplated hereinbefore in connection with the description of both background and historical data relating to the origin of the present invention.

Figure 4:
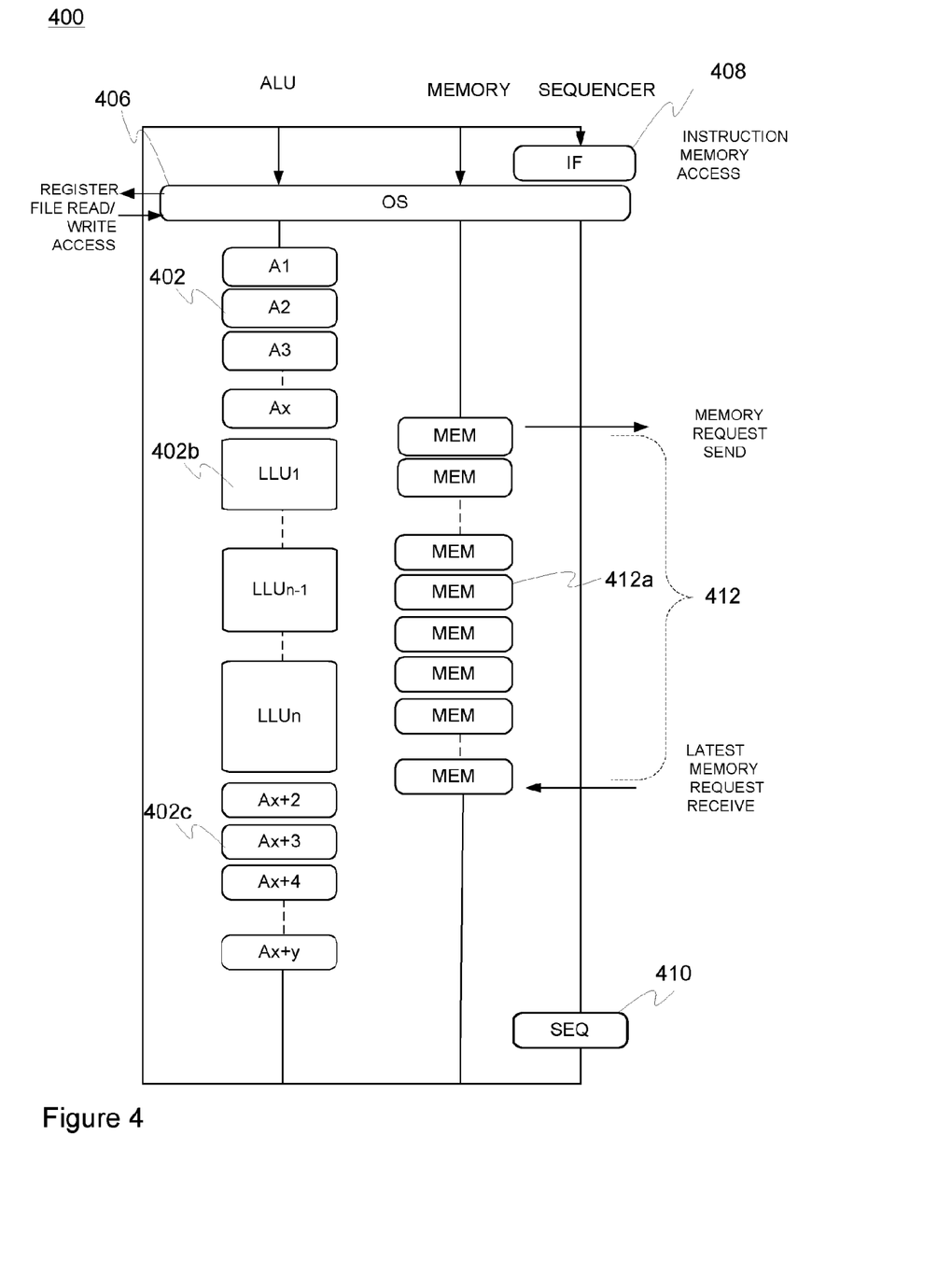
FIG. 4 illustrates an embodiment of the pipeline architecture in accordance with the present invention.

FIG. 4 illustrates one embodiment of the present invention incorporating ESM pipeline architecture 400 with a plurality (N) of long latency units (LLU) 402b as well as other functional units (FU) such as (ordinary or lower latency) ALUs 402, 402c. These other functional units such as ALUs may be positioned before 402 and after 402c the memory access segment 412 and thus, the LLUs 402b.

The layout of the functional units 402, 402b, 402c is merely exemplary in the figure and in other embodiments, the positioning, number and nature/latency thereof may diverge from the illustrated one. The functional units 402, 402b, 402c have been provided with unique identifiers in connection with general identifiers A(LU) and LLU to bring forward the fact that the units 402, 402b, 402c may mutually differ, also within the same general type (A/LLU) in terms of structure and/or functionality. However, at least some of the units 402, 402b, 402c may be mutually similar in terms of structure and/or operation.

IF 408 refers to instruction fetch logic, MEM 412a refers to a single memory unit stage typically lasting for a clock cycle, and OS 406 refers to operand selection logic with register file read/write access actions. SEQ 410 refers to a sequencer.

Generally, the operands are selected by the responsible logic 406 in the beginning of the pipeline according to the corresponding operand selection field(s) in the instruction words. The operands may be passed to the functional units via a number of register pipes.

As mentioned hereinbefore, the long latency units 402b may have been designed for executing more complex operations, e.g. division and application-specific operations, and potentially organized as one or more chains of units residing in parallel with the memory unit wait segment and connected in the middle of the overall ALU chain or pipeline structure 414.

By disposing at least some long latency units 402b functionally and temporally in parallel with the memory access segment 412 incorporating a plurality of memory (wait) stages 412a, as shown in the figure, the execution time of long latency operations may be scaled down to a single ESM step. The LLUs 402b may advantageously execute their tasks simultaneously with the memory access operation.

Considering the execution process of instructions involving LLU(s) in more detail, the LLUs 402b are preferably controlled with dedicated field(s) in the instruction word just like the rest of the functional units in the ESM. Operands for these operations may be selected in the operand select (OS) stage 406 of the pipeline, or they can alternatively be inherited from the results produced by the ALUs 402 residing in the chain before the memory wait segment 412.

The long latency operations are then executed in the order specified by the placement of and/or connections between the LLUs 402*b*.

Generally, two or more functional units 402, 402*b*, 402*c* (mutually similar or different) such as LLUs or e.g. a combination of ALUs 402, 402*c* and LLUs 402*b* may be chained together such that data may be passed from one unit to another. The chained functional units may be configured to execute mutually different operations on the input data (operands).

The results of long latency operations can, for example, be used as operands for the rest of the ALUs 402*c* or sequencer 410. In order to have full throughput, LLUs 402*b* shall be internally pipelined.

As a result, a programmer can apply up to N long latency operations during a single step of execution. These operations can even be dependent on each other if they are placed into a chain of units accordingly. And what is remarkable, the suggested solution does not generally increase the length of the processor pipeline. Naturally, the executed memory operation shall be independent of the long latency operations executed meanwhile within a step of execution.

The varying physical dimensions of the depicted entities representing functional units such as LLUs 402*b* and ALUs 402, 402*c* indicate the fact that the complexity or latency of the LLUs 402*b* and/or other functional units 402, 402*c* applied may mutually vary as well. Areas covered by the rectangles/lengths of the rectangles in vertical direction imply the execution time or latency of the corresponding units, i.e. ALUs 402, 402*c* associated with shorter latency are depicted as shorter/smaller rectangles as the LLUs 402*b*.

In some embodiments, a number of functional units such as LLUs 402*b* may be introduced to the pipeline such that more complex/more latency-causing unit(s) are located therein later (considering the execution flow) than the unit(s) of lesser complexity/latency. And with particular reference to the memory access segment 412, the more complex unit(s) may be disposed substantially in parallel with the end portion of the segment preceded by the simpler ones, for example.

Figure 5:
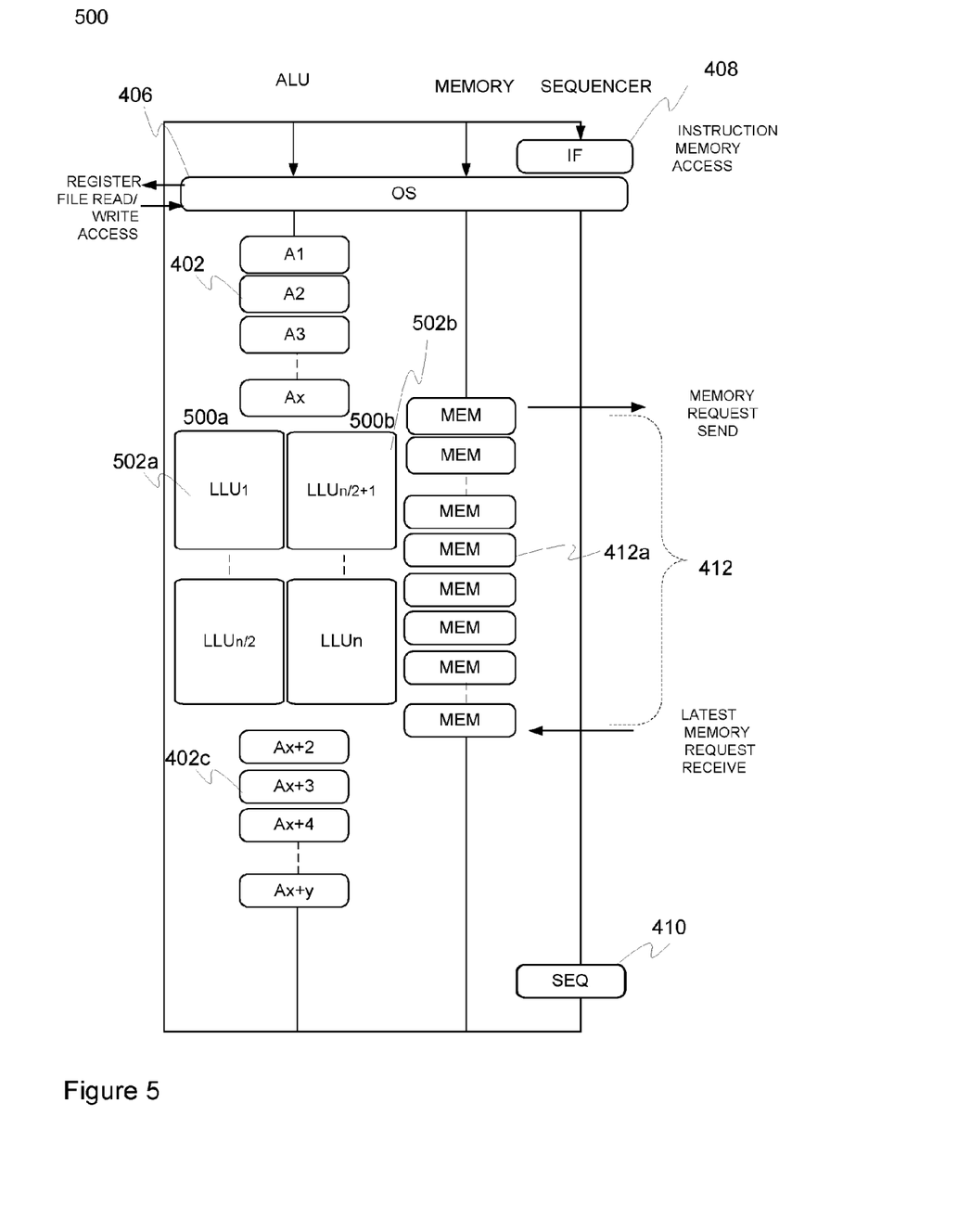
FIG. 5 illustrates another embodiment of the pipeline architecture in accordance with the present invention.

FIG. 5 illustrates another embodiment of the pipeline architecture 500 in accordance with the present invention.

Also in this embodiment, IF 408 refers to instruction fetch logic, MEM 412*a* refers to a single memory unit stage typically lasting for a clock cycle, OS 406 refers to operand selection logic with register file read/write access actions, and SEQ 410 refers to a sequencer.

In this embodiment, the pipeline comprises separate, functionally and logically parallel, branches 500*a*, 500*b* of long latency units (LLU) 502*a*, 502*b* respectively for performing related long latency operations. A branch 502*a*, 502*b* may comprise only one LLU or a plurality of LLUs and optionally one or more other functional units (FU) such as multiple ALUs for carrying out operations such as predetermined arithmetic and logical operations on the data provided thereto. The branches may be of limited length and be preceded and/or followed by common, shared, pipeline segment(s).

The parallel branches 500*a*, 500*b* of the pipeline may exist in parallel with the memory access segment 412 only (the visualized case), or extend beyond that, thus potentially also preceding or following the memory access segment 412. In some embodiments, the branches may, on the other hand, define a pipeline segment that is shorter than the memory access segment 412. Accordingly, the actual functional units such as LLUs located in the parallel branches 500*a*, may also be configured as mutually substantially (functionally/temporally) parallel as indicated in the figure, wherein LLUs 502*a*, 502*b* have been depicted as fully parallel relative to the pipeline.

By way of example, latency or complexity of each particular functional unit is again depicted in the figure by the size, or length, of the corresponding block. In the shown embodiment, the branches contain equal number of equally complex (same or similar latency-causing) LLUs 502, but a person skilled in the art certainly realizes that in various other feasible embodiments, a number of LLUs within a branch and/or between branches may be of mutually different complexity/latency. In some embodiments, the LLUs positioned in the branches are selected so that the latencies caused by the parallel branches are substantially equal and/or remain within the overall duration of the memory access segment 412. In some embodiments, LLU with longer latency is disposed later in the pipeline than LLU with shorter latency.

Two or more, optionally all, LLUs 502*a*, 502*b* disposed in each branch 500*a*, 500*b* may have been chained according to the principles set forth hereinbefore to pass data therebetween, etc. Chaining may increase the obtained performance through exploitation of available virtual instruction-level parallelism.

Generally, the functional units 402, 402*b*, 402*c*, 502*a*, 502*b* may be controlled by VLIW-style sub-instruction operation fields, for instance. After the target operation has been executed by a functional unit, the result may be made available to the functional unit(s) situated after that unit in the respective chain via elements including e.g. multiplexers controlled by the current instruction word.

Ultimately, a skilled person may, on the basis of this disclosure and general knowledge, apply the provided teachings in order to implement the scope of the present invention as defined by the appended claims in each particular use case with necessary modifications, deletions, and additions, if any. Generally, the various principles set forth herein could be also at least selectively utilized in processor architectures not falling under the ESM definition adopted herein, as being readily understood by the persons skilled in the art.

The invention claimed is:

1. A processor architecture arrangement for emulated shared memory (ESM) architectures, comprising a number of multi-threaded processors each provided with interleaved inter-thread pipeline having a memory access segment and a plurality of functional units arranged in series for executing arithmetic and, logical operations on data, wherein one or more of the functional units have lower latency and are positioned prior to the memory access segment in said pipeline, and wherein one or more of the functional units have long latency for executing more complex operations associated with the functional units requiring longer latency than the functional units requiring lower latency, and wherein the one or more functional units having long latency are positioned operatively in parallel with the memory access segment.

2. The processor architecture arrangement of claim 1, wherein a number of functional units are functionally positioned after the memory access segment in the pipeline.

3. The processor architecture arrangement of claim 1, wherein at least two long functional latency units are chained together, wherein a long latency functional unit is configured to pass operation result to a subsequent unit in the chain as an operand.

4. The processor architecture arrangement of claim 1, wherein one or more functional units of lower latency include at least one ALU for integer arithmetics.

5. The processor architecture of claim 1, wherein the pipeline incorporates at least two parallel branches, each branch including at least one long latency functional unit in parallel with the memory access segment.

6. The processor architecture arrangement of claim 5, wherein at least two branches extend beyond the memory access segment relative to the pipeline, the extensions preceding and/or following the memory access segment.

7. The processor architecture arrangement of claim 6, wherein a number of functional units in a branch are functionally positioned substantially before and/or after the memory access segment.

8. The processor architecture arrangement of claim 1, including at least two long latency functional units in parallel with the memory access segment that are mutually of different complexity in terms operation execution latency.

9. The processor architecture arrangement of claim 8, wherein a long latency functional unit associated with longer latency is logically located operatively in parallel with an end portion of the memory access segment and after a long latency functional unit associated with shorter latency.

10. The processor architecture arrangement of claim 1, wherein one or more functional units are controlled through a number of operation selection fields of instruction words.

11. The processor architecture arrangement of claim 1, wherein a number of operands for a functional unit are determined in an operand select stage of the pipeline in accordance with a number of operand selection fields given in an instruction word.

12. The processor architecture arrangement of claim 1, wherein at least one long latency functional unit is designed for division, root calculation or an application-specific purpose.

13. The processor architecture arrangement of claim 1, including at least one long latency functional unit configured to execute one or more operations on input data and at least one other long latency functional unit configured to execute one or more other operations on input data.

* * * * *